US012409454B2

(12) United States Patent
Ung et al.

(10) Patent No.: US 12,409,454 B2
(45) Date of Patent: Sep. 9, 2025

(54) EVAPORATIVE CONTROL LID FOR MULTI-WELL SAMPLE TRAYS

(71) Applicant: SARTORIUS BIOANALYTICAL INSTRUMENTS, INC., Bohemia, NY (US)

(72) Inventors: Thang Ung, San Ramon, CA (US); Colin Crawford, Oakland, CA (US)

(73) Assignee: Sartorius BioAnalytical Instruments, Inc., Bohemia, NY (US)

( * ) Notice: Subject to any disclaimer, the term of this patent is extended or adjusted under 35 U.S.C. 154(b) by 743 days.

(21) Appl. No.: 17/721,877

(22) Filed: Apr. 15, 2022

(65) Prior Publication Data

US 2023/0330678 A1 Oct. 19, 2023

(51) Int. Cl.
*B01L 3/00* (2006.01)

(52) U.S. Cl.
CPC ..... *B01L 3/50853* (2013.01); *B01L 2300/046* (2013.01); *B01L 2300/0829* (2013.01)

(58) Field of Classification Search
CPC ........... B01L 3/50853; B01L 2300/046; B01L 2300/0829; B01L 2200/025; B01L 2200/026; B01L 2200/142; B01L 2300/04; B01L 2300/041
See application file for complete search history.

(56) References Cited

U.S. PATENT DOCUMENTS

| | | | | |
|---|---|---|---|---|
| 5,604,130 | A | 2/1997 | Warner et al. | |
| 5,972,694 | A | 10/1999 | Mathus | |
| 7,152,492 | B2 | 12/2006 | Zwick et al. | |
| 7,309,603 | B2 | 12/2007 | Ma et al. | |
| 7,854,343 | B2 | 12/2010 | Ellson et al. | |
| 10,625,264 | B2 | 4/2020 | Hong et al. | |
| 2004/0089615 | A1 * | 5/2004 | Weiss ................. | B01L 3/50853 210/739 |
| 2004/0115798 | A1 | 6/2004 | Ma et al. | |
| 2006/0188404 | A1 | 8/2006 | Gjerde | |
| 2010/0197525 | A1 | 8/2010 | Davies et al. | |

FOREIGN PATENT DOCUMENTS

| | | | |
|---|---|---|---|
| WO | WO 02/072423 | A1 | 9/2002 |
| WO | 2016138338 | A1 | 9/2016 |

OTHER PUBLICATIONS

Wagener et al., Eppendorf 96-Well Cell Culture Plate—A Simple method of minimizing the edge effect in cell-based assays. Eppendorf. Apr. 2014;326: 6 pages.

* cited by examiner

*Primary Examiner* — Jennifer Wecker
*Assistant Examiner* — Steven Ray Castaneda
(74) *Attorney, Agent, or Firm* — Wolf, Greenfield & Sacks, P.C.

(57) ABSTRACT

A cover configured to reduce evaporation from a multi-well sample tray while permitting sampling of material housed in separate wells of the tray. The cover may directly engage the sample tray and move with the sample tray or the cover may be stationary while permitting movement of the sample tray relative to the cover.

20 Claims, 10 Drawing Sheets

27
24
3
2
22
4
54
20
12
26

EVAPORATIVE CONTROL LID FOR MULTI-WELL SAMPLE TRAYS

BACKGROUND

Bio-layer interferometry (BLI) is an analytical technique commonly used to measure biomolecular interactions. BLI analysis commonly uses a multi-well sample tray with each well containing a biomolecule in a suitable liquid. A typical multi-well sample tray 2 has a plurality of regularly spaced sample wells 4 arranged in a rectangular configuration. In most configurations, sample tray 2 rests on a shaker or other device which provides movement sufficient to maintain the material 6 within sample wells 4 in the form of a suspension. Due to the continuous movement of sample tray 2 and the small sample size, evaporative loss of liquid material 6 from sample wells 4 sometimes occurs leading to a decrease in accuracy of the BLI analysis. See for example FIG. 10. Therefore, a multi-well sample tray evaporation control cover which precludes or limits evaporative loss from the sample trays 2 will enhance the accuracy of the BLI analysis. Preferably, the evaporation control cover will achieve this goal while permitting BLI analysis without removal of the evaporation control cover and while permitting continuous movement of the multi-well sample tray.

SUMMARY

In one embodiment the present invention provides an evaporation control cover for use with a multi-well sample tray. The multi-well sample tray has a plurality of regularly spaced sample wells as defined by an outer perimeter of sample wells, with additional sample wells located within the outer perimeter of sample wells. The evaporation control cover comprises a plurality of sample holes arranged to correspond to the plurality of sample wells. The sample holes are defined by an outer perimeter of holes with additional sample holes located within the outer perimeter of holes. Optionally, a fluid port located in the cover provides fluid communication through the cover. The sample holes located within the outer perimeter of holes have a first diameter while the sample holes forming the perimeter holes have a second diameter which is less than or equal to the first diameter. The evaporation control cover carries a downwardly projecting flange configured to fit over the multi-well tray.

In an alternative embodiment, the present invention provides an evaporation control cover for use with a multi-well sample tray. The multi-well sample tray has a plurality of regularly spaced sample wells defined by an outer perimeter of sample wells with additional sample wells located within said outer perimeter of sample wells. The evaporation control cover comprises a top. The top includes a plurality of sample holes corresponding to the plurality of sample wells. Additionally, the top carries a downwardly projecting flange configured to fit over the multi-well tray. The cover also includes a bottom. The bottom has a plurality of upwardly projecting ports providing fluid communication through the bottom. The upwardly projecting ports configured to correspond to said plurality of sample wells. The bottom carries an upwardly projecting flange configured to fit within the downwardly projecting flange of the top. The upwardly projecting flange and the upwardly projecting ports define a reservoir suitable for retaining a liquid. Further, the upwardly projecting ports provide fluid communication between the sample holes and the sample wells. This embodiment may optionally include a wettable insert capable of absorbing and releasing a liquid. The wettable insert has a plurality of insert holes corresponding to said plurality of sample wells.

In another alternative embodiment, the present invention provides an evaporation control cover for use with a multi-well sample tray. The multi-well sample tray has a plurality of regularly spaced sample wells arranged in a rectangular configuration as defined by a first outer perimeter row, a second outer perimeter row, a third outer perimeter row and a fourth outer perimeter row. The outer perimeter rows defining the rectangular configuration have a first corner well, a second corner well, a third corner well and a fourth corner well with additional rows of sample wells located within the rectangular configuration. The evaporation control cover comprises a top. The top includes a plurality of sample holes arranged in a rectangular configuration corresponding to the plurality of sample wells and defined by a first top outer perimeter row, a second top outer perimeter row, a third top outer perimeter row and a fourth top outer perimeter row. The top outer perimeter rows defining the rectangular configuration further include a first top corner hole, a second top corner hole, a third top corner hole and a fourth top corner hole with additional rows of sample holes located within the rectangular configuration. The sample holes located to the interior of the first top outer perimeter row, the second top outer perimeter row, the third top outer perimeter row and the fourth top outer perimeter row have a first diameter. The sample holes within the first top outer perimeter row, the second top outer perimeter row, the third top outer perimeter row and the fourth top outer perimeter row have a second diameter which is less than or equal to the first diameter. Additionally, the top carries a downwardly projecting flange configured to fit over the multi-well tray. The cover also includes a bottom. The bottom has a plurality of upwardly projecting ports providing fluid communication through the bottom. The upwardly projecting ports have a rectangular configuration corresponding to the plurality of sample wells. The rectangular configuration is defined by a first bottom outer perimeter row, a second bottom outer perimeter row, a third bottom outer perimeter row and a fourth bottom outer perimeter row. The bottom outer perimeter rows defining the rectangular configuration have a first corner upwardly projecting port, a second corner upwardly projecting port, a third corner upwardly projecting port and a fourth corner upwardly projecting port. Additional rows of upwardly projecting ports are located within the rectangular configuration. The bottom carries an upwardly projecting flange configured to fit within the downwardly projecting flange of the top. The upwardly projecting flange and the upwardly projecting ports define a reservoir suitable for retaining a liquid. Further, the upwardly projecting ports provide fluid communication between the sample holes and the sample wells. This embodiment may optionally include a wettable insert capable of absorbing and releasing a liquid. The wettable insert has a plurality of insert holes in a rectangular configuration corresponding to said plurality of sample wells.

DETAILED DESCRIPTION

Figure 1:
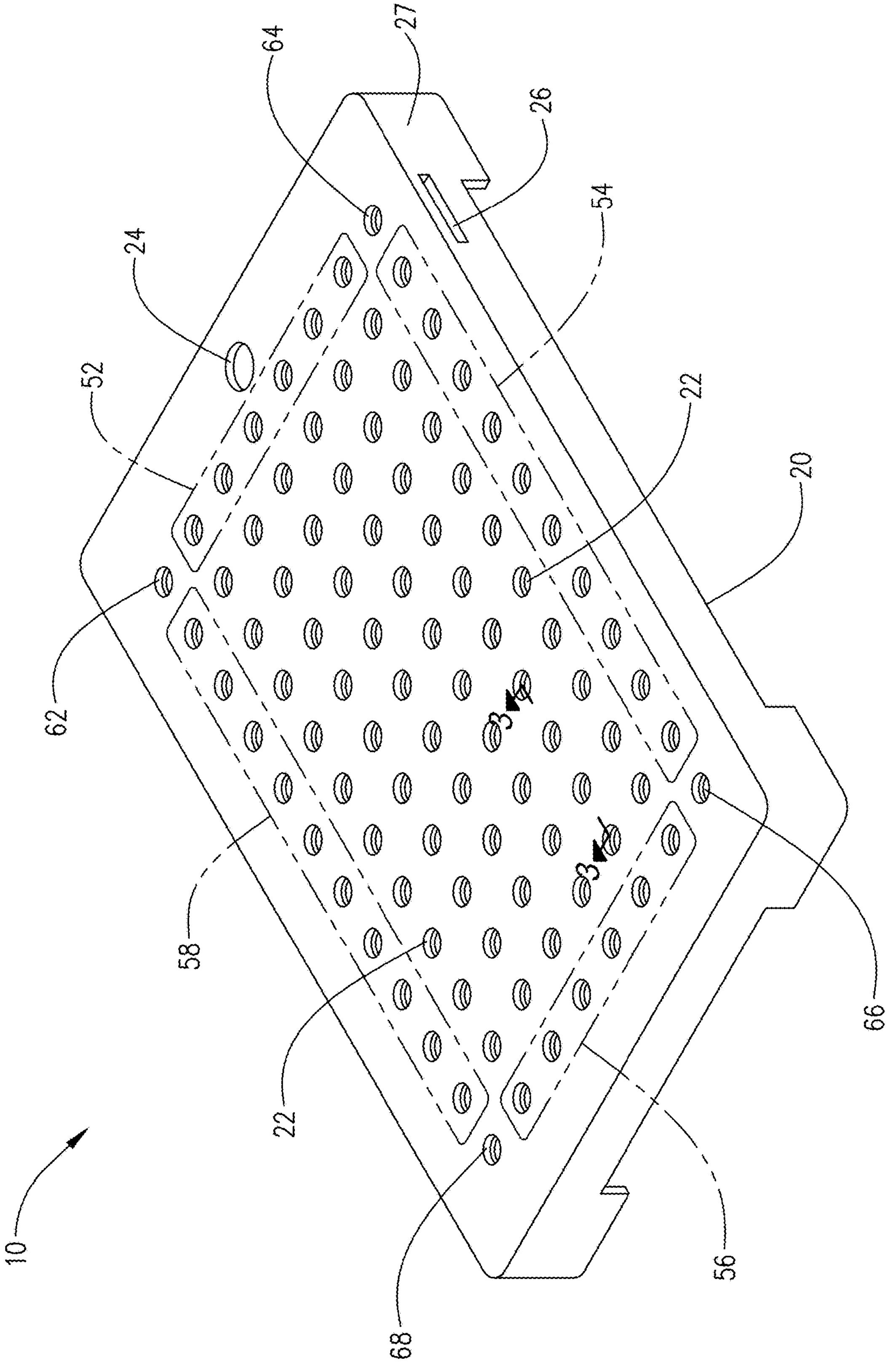
FIG. 1 provides a perspective view of one embodiment of the multi-well sample tray evaporation control cover.

The drawings included with this application illustrate certain aspects of the embodiments described herein. However, the drawings should not be viewed as exclusive embodiments. For simplicity and clarity of illustration, where appropriate, reference numerals may be repeated among the different figures to indicate corresponding or analogous elements and the drawings are not necessarily to scale. Throughout this disclosure, the terms "about", "approximate", and variations thereof, are used to indicate that a value includes the inherent variation or error for the device, system, the method being employed to determine the value, or the variation that exists among the study subjects. Finally, the description is not to be considered as limiting the scope of the embodiments described herein.

FIGS. 1-9 depict embodiments of the evaporation control cover 10. As depicted, evaporation control cover 10 is particularly adapted for use with a multi-well sample tray 2 having sample wells 4. A typical multi-well sample tray 2 has 96 sample wells 4. Of course, the configuration of evaporation control cover 10 may be modified to accommodate multi-well sample trays 2 of differing configurations.

Figure 4:
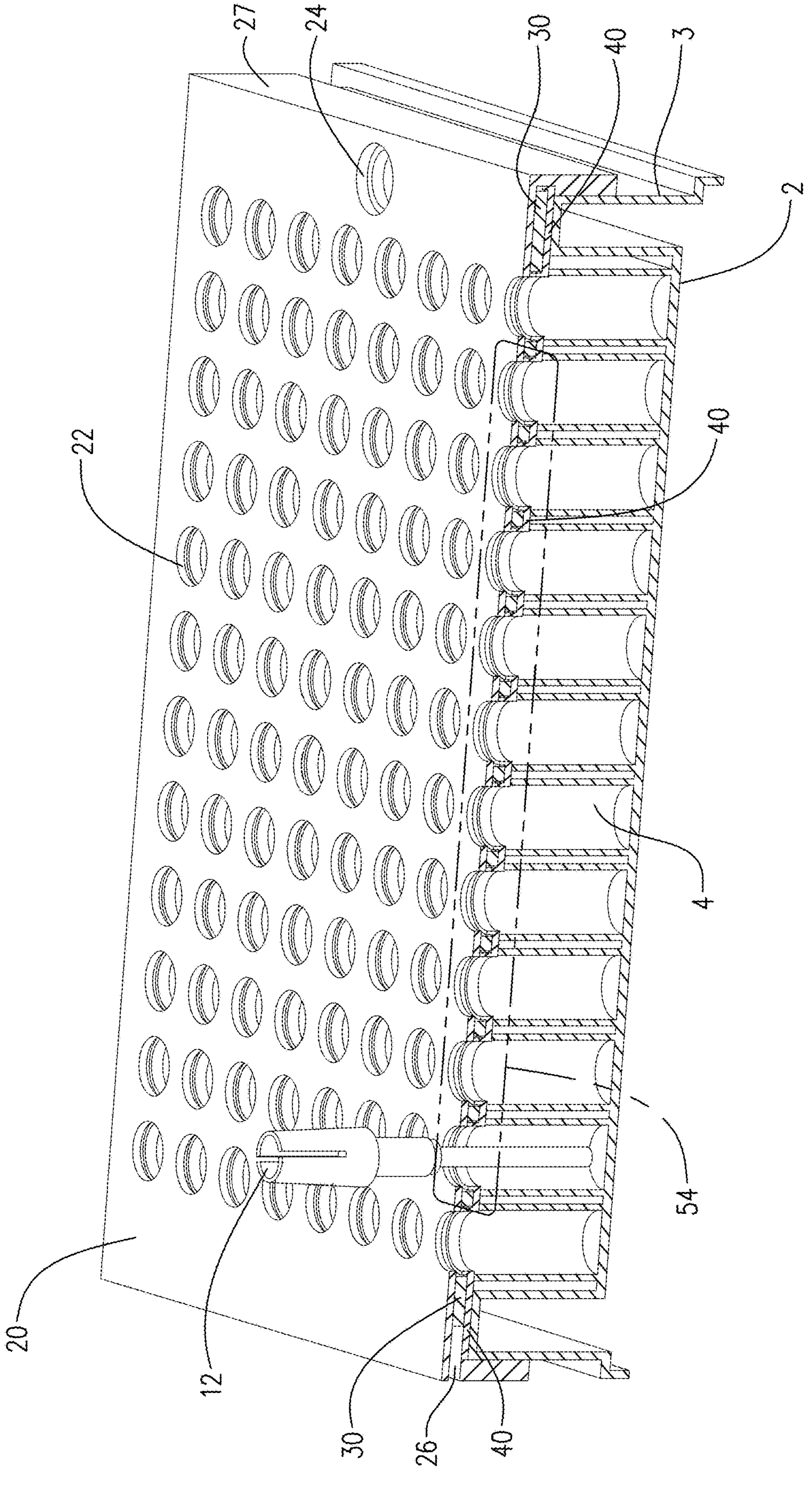
FIG. 4 provides a partial cut-away perspective view depicting an embodiment of the evaporation control cover as installed on a multi-well tray where the evaporation control cover moves with the multi-well tray.
Figure 6:
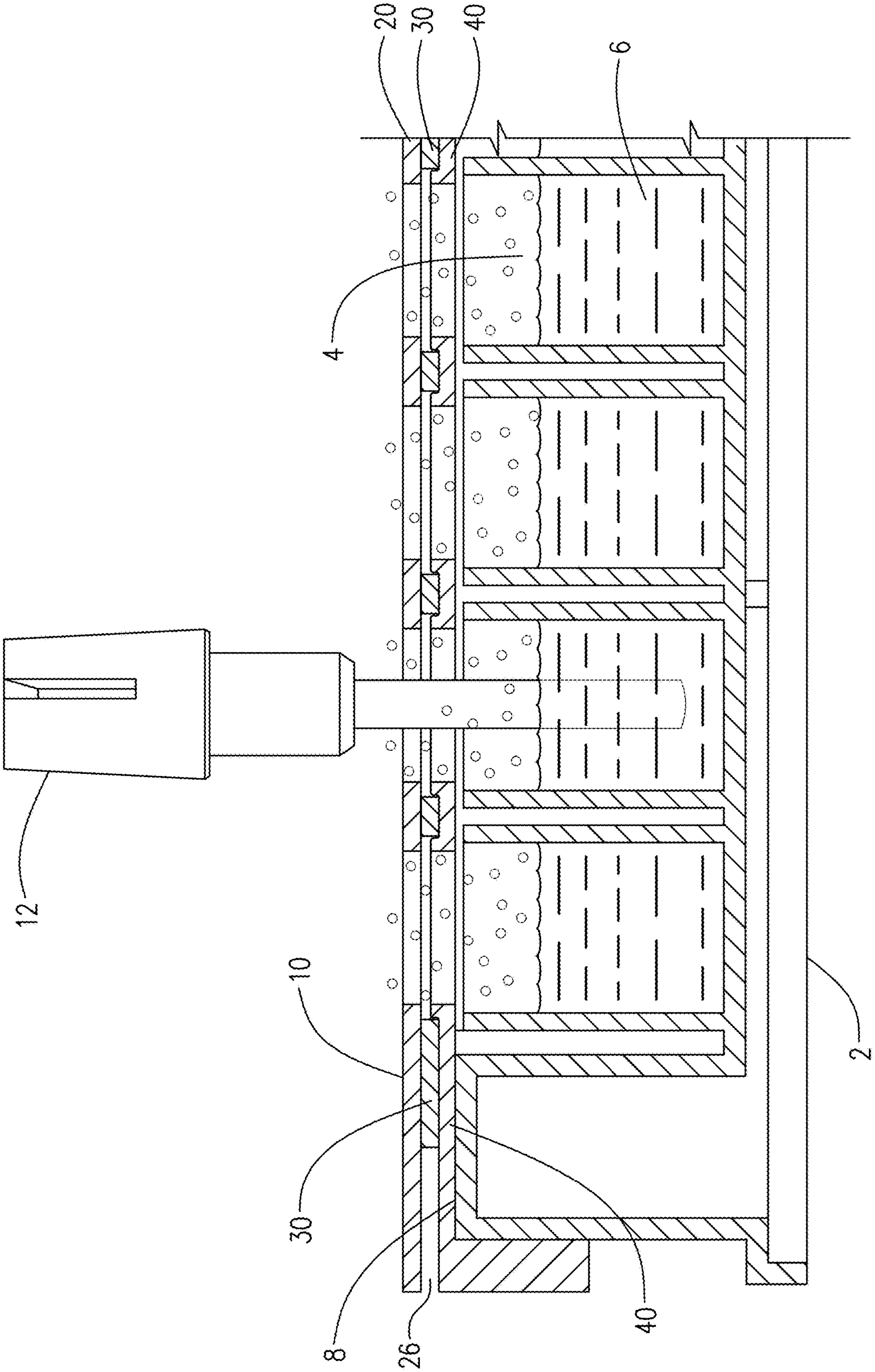
FIG. 6 depicts an analytical probe passing through the embodiment of FIG. 4 into a sample well.
Figure 9:
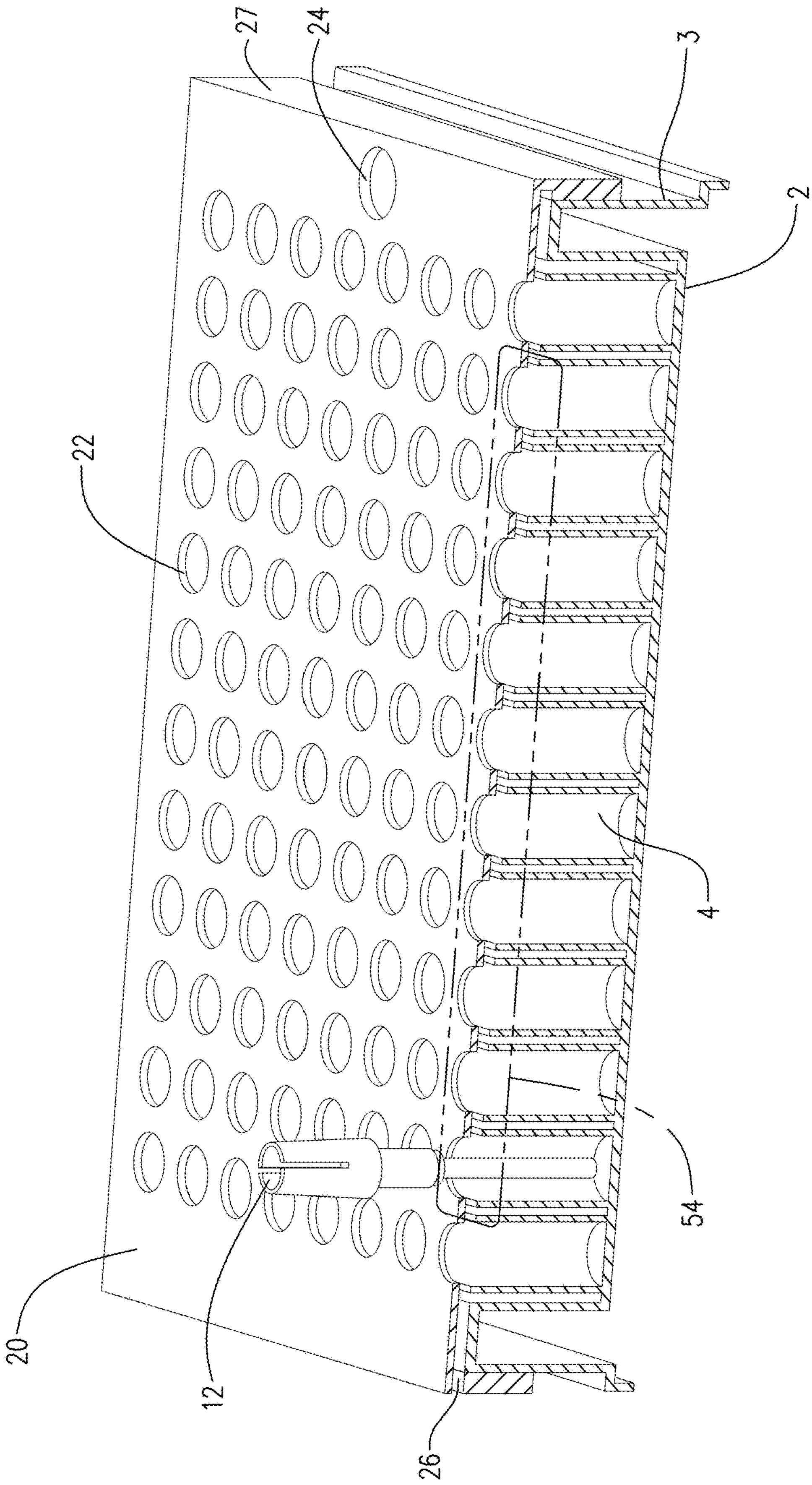
FIG. 9 depicts a partial cut-away perspective view depicting another embodiment of the evaporation control cover as installed on a multi-well tray where the evaporation control cover moves with the multi-well tray.
Figure 10:
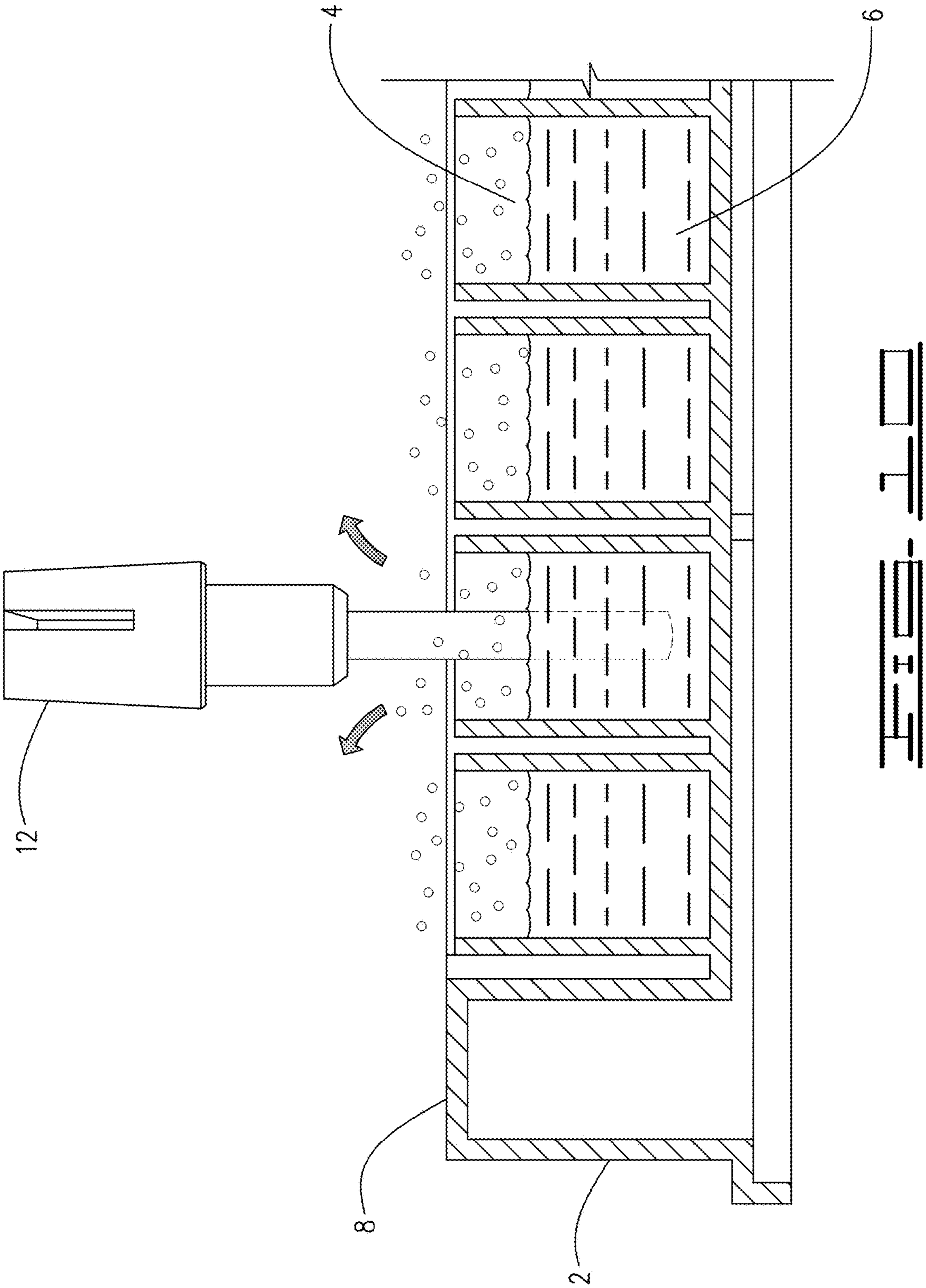
FIG. 10 PRIOR ART
FIG. 10 depicts a prior art view of an analytical probe positioned within a well of a multi-well tray lacking an evaporation control cover.

As depicted in FIG. 4, evaporation control cover 10 may be configured to engage sample tray 2 and thereby move with sample tray 2. In one embodiment, the design of evaporation control cover 10 may provide a close engagement with sample tray 2. For example, evaporative control cover 10 may be configured to provide a frictional or snap fit securement to sample tray 2. FIGS. 6 and 9 depict examples where cover 10 nests over and engages sample tray 2. Typically, when evaporation control cover 10 engages sample tray 2, holes 22 remain in a consistent aligned position over sample wells 4.

Figure 5:
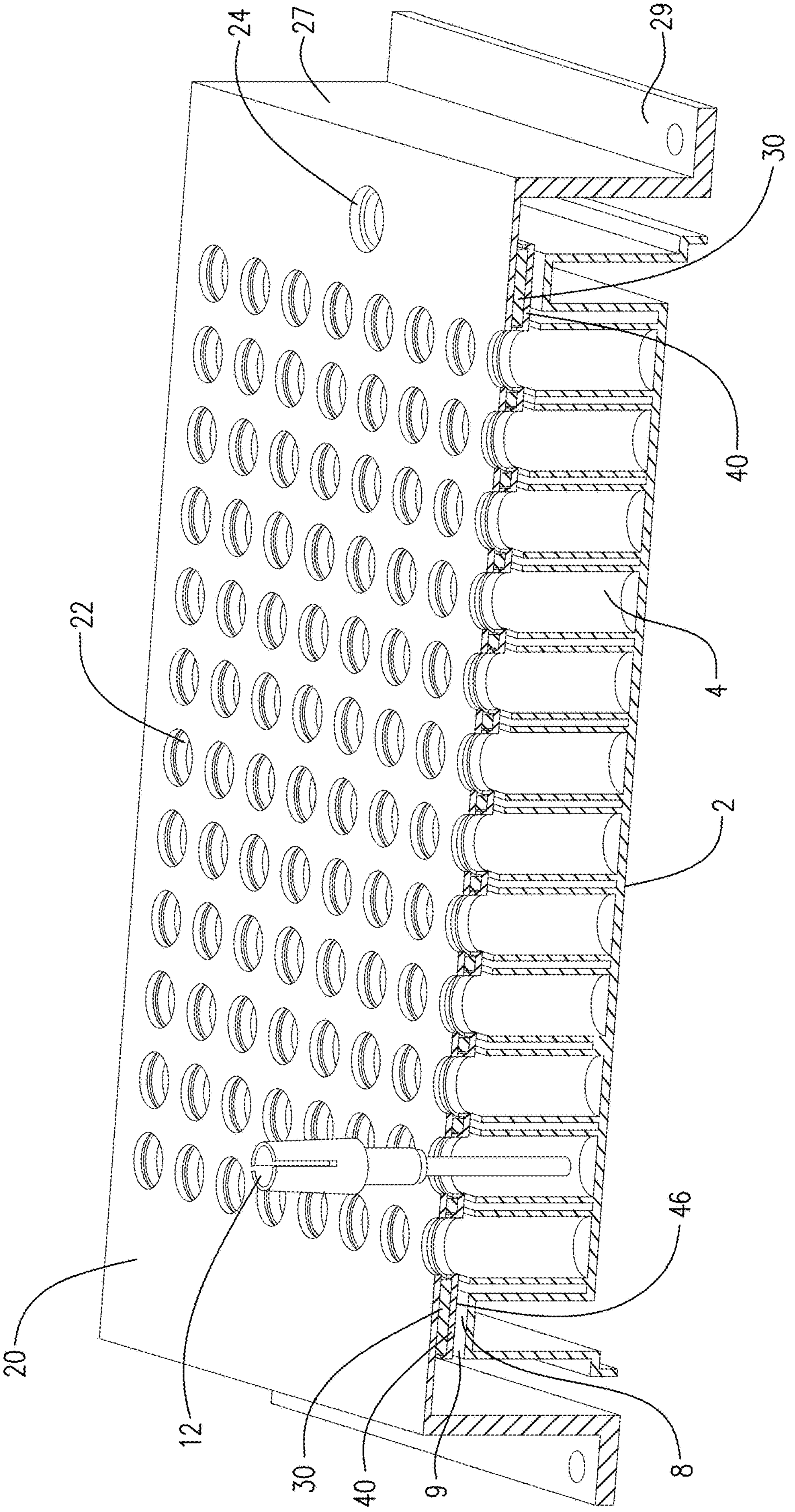
FIG. 5 provides a partial cut-away perspective view depicting another embodiment of the evaporation control cover where the evaporation control cover remains stationary while the multi-well tray moves beneath the evaporation control cover.
Figure 7:
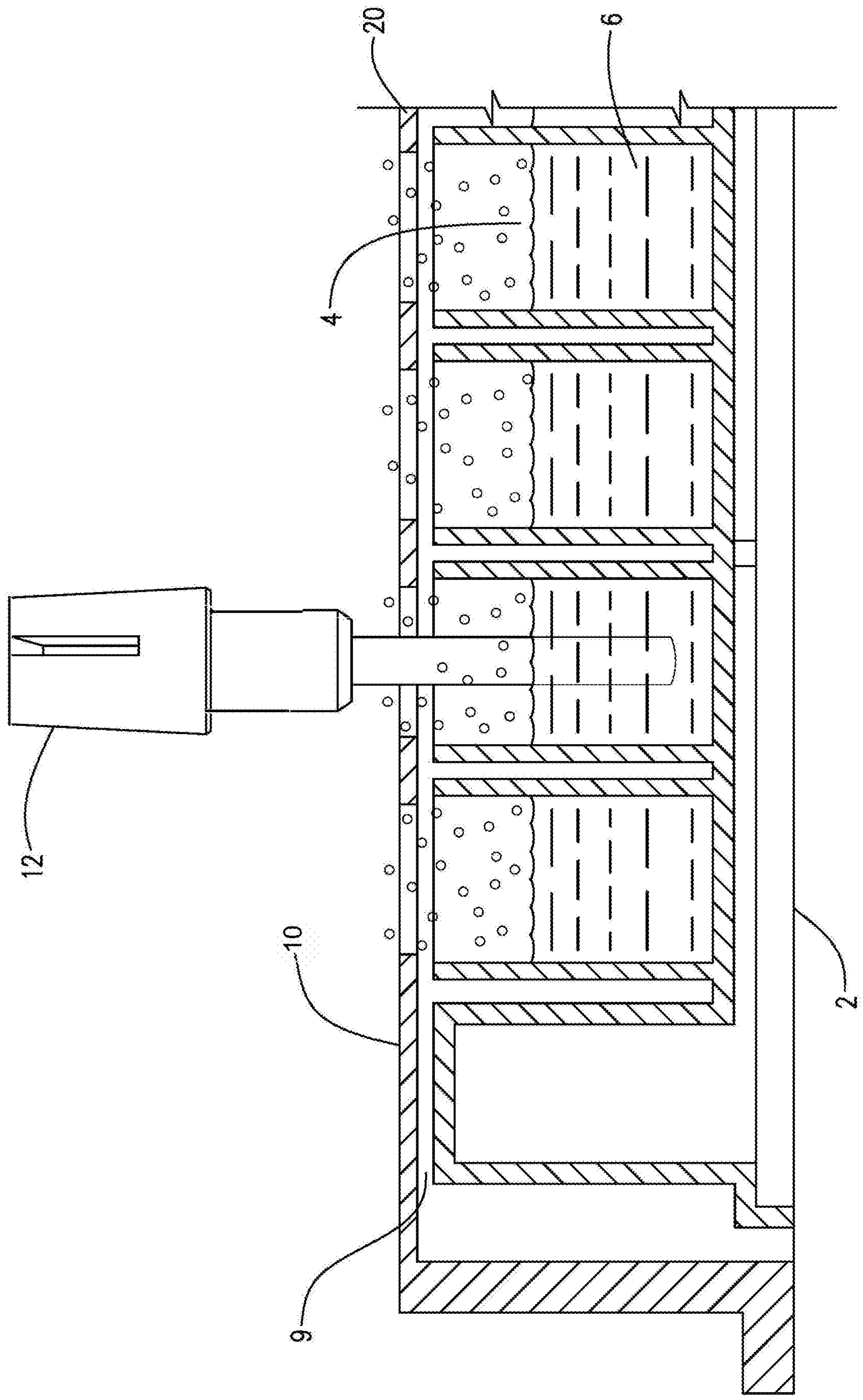
FIG. 7 depicts an analytical probe passing through another embodiment of the evaporation control cover where the evaporation control cover lacks a bottom and a wettable insert, and the evaporation control cover remains stationary.
Figure 8:
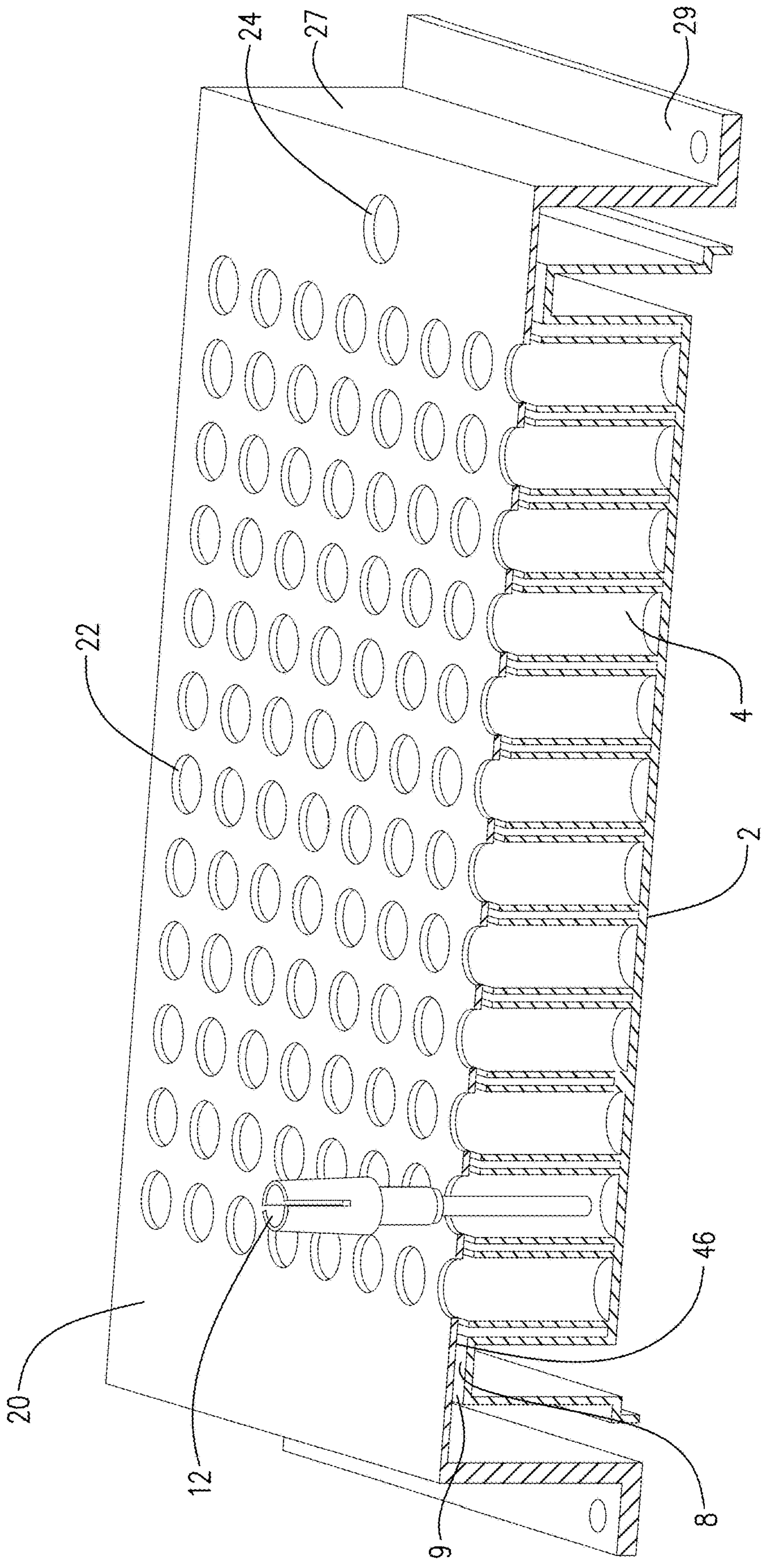
FIG. 8 depicts a partial cut-away perspective view depicting the embodiment of FIG. 7.

Alternatively, evaporation control cover 10 may be configured to permit movement of sample tray 2 while evaporation control cover 10 remains stationary. As depicted in FIGS. 5, 7 and 8 evaporation control cover 10 may be configured to permit securement of evaporation control cover 10 to a surface outside of the region supporting multi-well sample tray 2. In this configuration, evaporation control cover 10 may touch the upper surface of multi-well sample tray 2 so long as the contact does not inhibit the movement of multi-well sample tray 2. More typically, a slight gap 9 sufficient to permit movement of the multi-well sample tray 2 relative to control cover 10 will be provided between the upper surface 8 of multi-well sample tray 2 and the lower surface 46 of evaporation control cover 10. Typically, the gap will be between about 0.1 mm and about 1.0 mm. Thus, gaps of 0.2 mm, 0.3 mm, 0.4 mm, 0.5 mm, 0.6 mm, 0.7 mm, 0.8 mm, and 0.9 mm will also be appropriate.

One embodiment of evaporation control cover 10 will be described with reference to FIGS. 1-6. As depicted therein, evaporation control cover 10 includes a top 20, a bottom 40 with a wettable insert 30 retained between top 20 and bottom 40. The combination of top 20, wettable insert 30, and bottom 40 cooperate to reduce or preclude the loss of liquid from sample wells 4.

Figure 3:
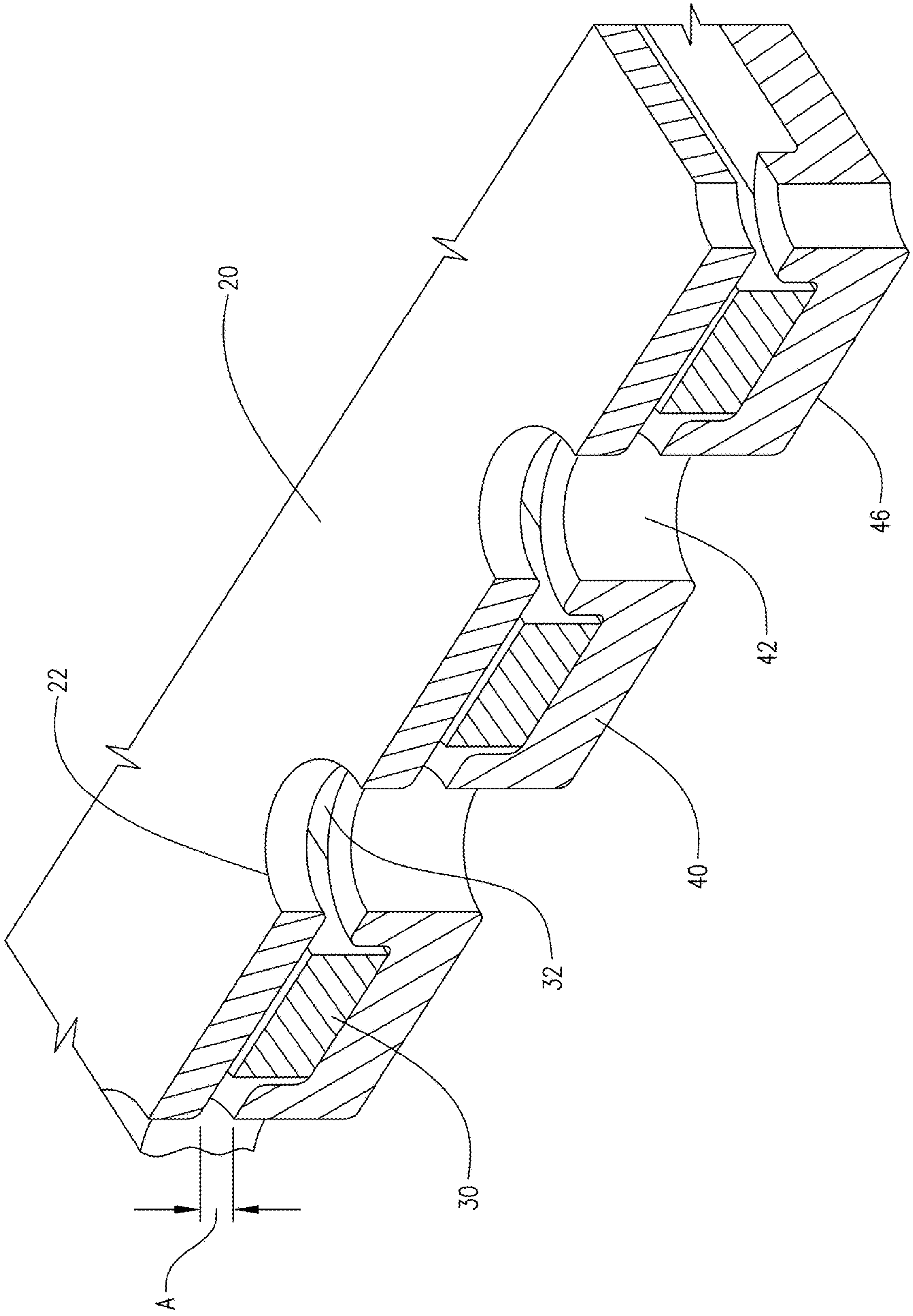
FIG. 3 provides a cut-away view along line 3-3 of FIG. 1 showing gap A and the multiple layers making up the evaporation control cover of FIGS. 1 and 2.

Without wishing to be bound by theory, the addition of liquids to wettable insert 30 is believed to enhance the functionality of evaporative control cover 10. Wettable insert 30 may have a thickness greater than Distance A depicted in FIG. 3. Distance A corresponds to the gap between the upper surface of bottom 40 and the lower surface of top 20. Thus, in some embodiments wettable insert 30 may be compressed between top 20 and bottom 40, i.e., insert 30 has a thickness greater than Distance A. Typically, wettable insert 30 will have a thickness which is 1.59 mm. However, wettable insert 30 may have a thickness which is less than, equal to or greater than distance A as depicted in FIG. 3. Depending on the application of evaporative control cover 10, distance A may range from about 0.1 mm to about 2 mm, from about 0.25 mm to about 1.5 mm or from about 0.5 mm to about 1 mm. Wettable insert 30 may be prepared as a felt, a non-woven or a woven material from a wide variety of materials capable of holding a liquid. For example, felts may be prepared from polypropylenes and polyesters. Sponges prepared from silicone, polyester, polypropylene, and polyethylene are also suitable for use as wettable insert 30. Likewise, open-cell foams prepared from silicone, polyurethane or polyethylene are suitable. Alternatively, a blanket like material prepared from polyimides will suffice.

As depicted in FIGS. 1-2, 4-5, 8, and 9 cover 10 includes an optional fluid port 24. In the depicted embodiment of FIGS. 1-2 4-5, 8, and 9 fluid port 24 provides fluid communication through top 20 to the interior of evaporation control cover 10 including wettable insert 30 and bottom 40. However, port 24 may take other forms. For example, as depicted in FIGS. 1, 4, 6, and 9 an alternative opening 26 through top 20 allows access to either wettable insert 30 or reservoir 48 through which fluid may be added. Alternative opening 26 may be located at any convenient location on a side of top 20. While FIG. 1 depicts both opening 26 and port 24, typically only one of these two elements will be present. In most instances the liquid used to wet wettable insert 30 will be the same as the liquid used within sample wells 4 less the biological material being analyzed. However, any liquid which will not interfere with the analytical process, and which will produce a sufficient partial pressure above sample wells 4 may be used. Typically, the fluid used to wet wettable insert 30 will be added to evaporation control cover 10 through fluid port 24. Of course, prior to initial assembly of evaporation control cover 10, wettable insert 30 may be pre-wetted with the desired fluid.

The wettable insert 30 may be pre-wetted through a variety of techniques, such as by applying a seal (e.g., film)

over the top 20 and/or bottom 40 of the cover 10 to contain the wettable insert 30; sealing the cover 10 with the wettable insert 30 in a bag; and/or positioning one or more plugs around the holes 32 of the wettable insert 30. The plugs may be made from a variety of materials, such as elastomer or plastic. Other techniques may also be used in other embodiments for pre-wetting the wettable insert 30 with the desired fluid.

In an alternative embodiment, wettable insert 30 may be replaced with any suitable solution used to wet wettable insert 30. Similarly, placing a saturated salt or other compatible solution in reservoir 48 will likely create a high humidity environment over the sample wells 4 sufficient to provide the desired reduction in evaporative loss from wells 4. For example, a potassium sulfate saturated water solution is known to create a 98% humidity above the solution.

Top 20 includes a downwardly projecting flange 27. In the embodiment of FIGS. 4 6, and 9 downwardly projecting flange 27 engages the outer surface 3 of sample tray 2. In the embodiment of FIGS. 5, 7 and 8, downwardly projecting flange 27 further carries an outwardly projecting flange 29 suitable for supporting cover 10 or top 20 when top 20 is used alone as depicted in FIGS. 7-8.

Top 20 includes a plurality of holes 22 providing fluid communication through top 20. As depicted in FIGS. 1-2, 4-5, 8, and 9 holes 22 are arranged in a plurality of rows laid out in a rectangular fashion. Thus, holes 22 correspond in location to sample wells 4. The plurality of rows of holes 22 are defined by a first outer perimeter row 52, a second outer perimeter row 54, a third outer perimeter row 56 and a fourth outer perimeter row 58. Each outer perimeter row 52-58 shares a corner hole or location 62, 64, 66 and 68 with an adjacent perimeter row 52-58 as depicted in FIG. 1. Thus, top 20 is configured to correspond to the arrangement of a conventional plate of sample tray 2. Top 20 can be modified in configuration to accommodate alternative sample tray 2 configurations.

Through multiple observations, sample wells 4 in the perimeter of multi-well sample tray 2 were determined to experience a higher rate of evaporative fluid loss than sample wells 4 to the interior of multi-well sample tray 2. Therefore, to provide the desired evaporative control, holes 22 in top 20 have differing diameters based on their location. Holes 22 located to the interior of perimeter rows 52-58 have a first diameter (D1). Holes 22 within perimeter rows 52-58 have a second diameter (D2) which is less than the first diameter and corner holes 62, 64, 66 and 68 have a third diameter (D3). The third diameter is equal to or less than the second diameter. Thus, the diameters for each location can be stated as $D1 \geq D2 \geq D3$. The sizes of the first diameter, second diameter and third diameter will depend on the configuration of evaporation control cover 10.

When evaporation control cover 10 has a configuration similar to that of FIG. 4, i.e., evaporation control cover 10 engages sample tray 2 and moves with sample tray 2, then D1 may be between about 0.7 mm and about 5.9 mm. More typically, D1 may be between about 1.4 mm and about 4.8 mm. In most cases, D1 will be between about 1.7 mm and about 4.4 mm. In this configuration, D2 may be from 0.2 times D1 to 0.85 times D1 and D3 is from 0.15 times D1 to 0.7 times D1. For example, when D1 is 2.0 mm, D2 may be between 0.4 mm and 1.7 mm and D3 may be between 0.3 mm and 1.4 mm. More typically, D2 is from 0.3 times D1 to 0.8 times D1 and D3 is from 0.2 times D1 to 0.6 times D1. In most cases, D2 is from 0.4 times D1 to 0.7 times D1 and D3 is from 0.25 times D1 to 0.5 times D1.

When evaporation control cover 10 has a configuration similar to that of FIG. 5, i.e., evaporation control cover 10 is stationary with sample tray 2 moving beneath it, then D1 may be 0.5 mm and about 5.0 mm. More commonly, D1 may be between about 0.7 mm and about 4.5 mm. More typically, D1 will be between about 0.9 mm and about 3.9 mm. In this configuration, D2 may be from 0.2 times D1 to 0.85 times D1 and D3 is from 0.15 times D1 to 0.7 times D1. For example, when D1 is 2.0 mm, D2 may be between 0.4 mm and 1.7 mm and D3 may be between 0.3 mm and 1.4 mm. More typically, D2 is from 0.3 times D1 to 0.8 times D1 and D3 is from 0.2 times D1 to 0.6 times D1. In most cases, D2 is from 0.4 times D1 to 0.7 times D1 and D3 is from 0.25 times D1 to 0.5 times D1.

In some embodiments, the desired reduction in evaporation from sample wells 4 will be achieved when D2 is 50% of D1 and D3 is 33% of D1.

Figure 2:
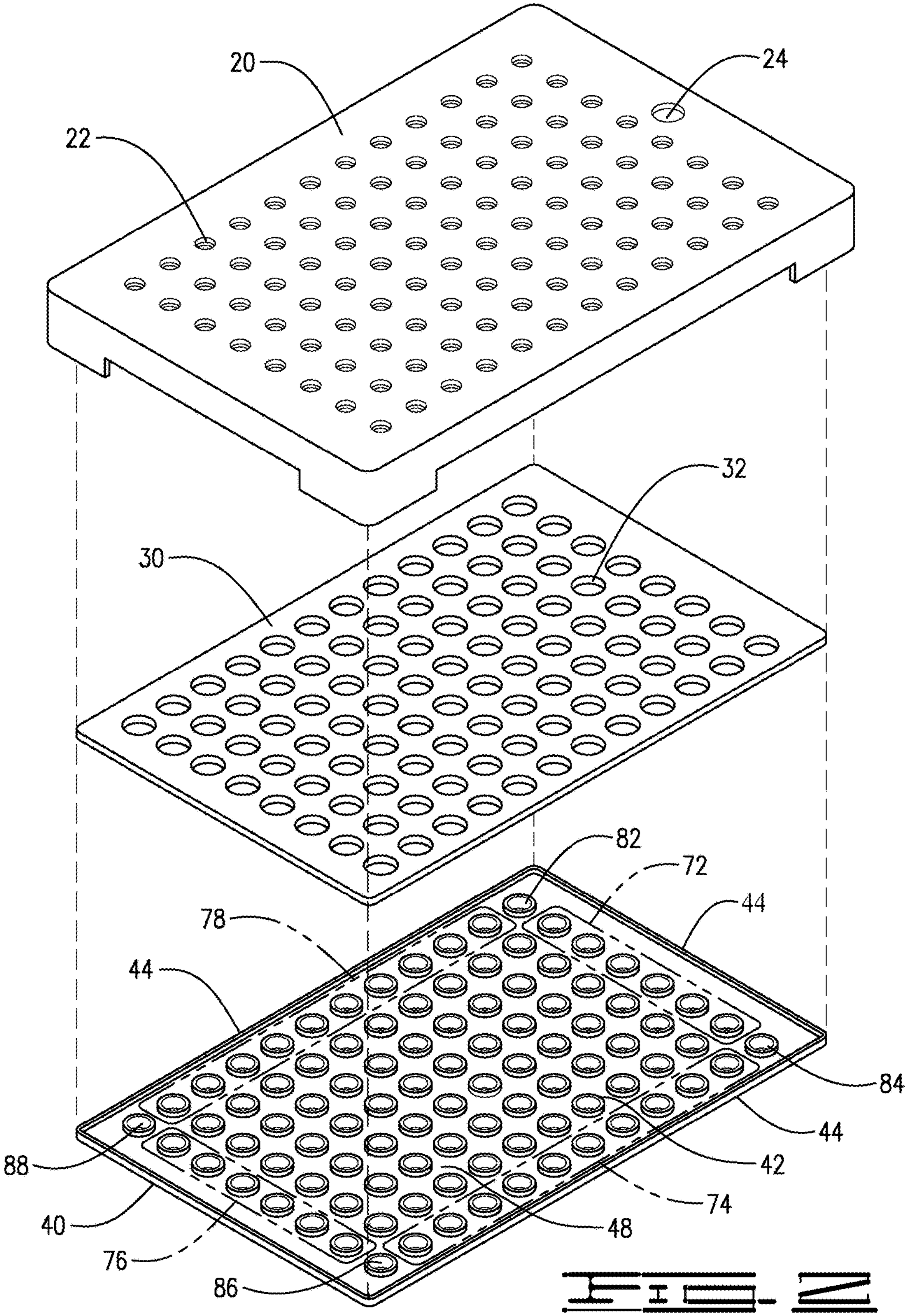
FIG. 2 provides an exploded view of the evaporation control cover of FIG. 1.

As depicted in FIGS. 2-3, bottom 40 includes a plurality of upwardly projecting ports 42. Ports 42 are aligned with holes 22. Ports 42 provide fluid communication through bottom 40. When in use, upwardly projecting ports 42 and holes 22 provide a passageway for a sensor probe 12 to pass through evaporation control cover 10 into selected sample well 4. Additionally, as depicted in FIGS. 2, 4-5, 8, and 9 upwardly projecting ports 42 are arranged in a plurality of rows laid out in a rectangular fashion corresponding to the rows of top 20. Thus, upwardly projecting ports 42 correspond in location to sample wells 4. The plurality of rows of upwardly projecting ports 42 are also defined by a first outer perimeter row 72, a second outer perimeter row 74, a third outer perimeter row 76 and a fourth outer perimeter row 78. Each outer perimeter row 72-78 shares a corner hole 82, 84, 86 and 88 with an adjacent perimeter row 72-78 as depicted in FIG. 2.

Bottom 40 carries an upwardly projecting flange 44. The region between upwardly projecting flange 44 and upwardly projecting ports 42 defines a reservoir 48. Reservoir 48 receives the wetting fluid through port 24 or alternatively through alternative opening 26 which permits fluid to pass between top 20 and bottom 40 into reservoir 48. Thus, liquid retained in reservoir 48 helps maintain wettable insert 30 sufficiently saturated to provide the desired evaporative control. Alternatively, as discussed above, reservoir 48 may be used to contain the desired liquid without the presence of wettable insert 30.

In some embodiments, upwardly projecting ports 42 in bottom 40 may have differing inside diameters based on their location. Upwardly projecting ports 42 located to the interior of perimeter rows 72-78 have a fourth inside diameter (D4). Upwardly projecting ports 42 within perimeter rows 72-78 have a fifth inside diameter (D5) which is less than or equal to the fourth diameter and corner holes 82, 84, 86 and 88 have a sixth inside diameter (D6). The sixth inside diameter is equal to or less than the fifth inside diameter. Thus, the diameters for each location can be stated as $D4 \geq D5 \geq D6$. The sizes of the fourth inside diameter, fifth inside diameter and sixth inside diameter will depend on the configuration of evaporation control cover 10. Upwardly projecting ports 42 also have outside diameters which may be from about 1 mm to about 3 mm greater than the corresponding inside diameters. When bottom 40 has ports 42 of differing sizes as outline above, top 20 may have holes 22 of uniform diameter. Likewise, when top 20 has holes 22 of differing sizes as previously defined, then bottom 40 may have projecting ports 42 of uniform diameter.

In most instances, D1 will equal D4, D2 will equal D5 and D3 will equal D6. Thus, when evaporation control cover 10 has a configuration similar to that of FIG. 4, i.e., evaporation control cover 10 engages sample tray 2 and moves with sample tray 2, then D4 may be between about 0.7 mm and about 5.9 mm. More typically, D4 may be between about 1.4 mm and about 4.8 mm. In most cases, D4 will be between about 1.7 mm and about 4.4 mm. In this configuration, D5 may be from 0.2 times D4 to 0.85 times D4 and D6 is from 0.15 times D4 to 0.7 times D4. More typically, D5 is from 0.3 times D4 to 0.8 times D4 and D6 is from 0.2 times D4 to 0.6 times D4. In most cases, D5 is from 0.4 times D4 to 0.7 times D4 and D6 is from 0.25 times D4 to 0.5 times D4.

When evaporation control cover 10 has a configuration similar to that of FIG. 5, i.e., evaporation control cover 10 is stationary with sample tray 2 moving beneath it, then D4 may be 0.5 mm and about 5.0 mm. More commonly, D4 may be between about 0.7 mm and about 4.5 mm. More typically, D4 will be between about 0.9 mm and about 3.9 mm. In this configuration, D5 may be from 0.2 times D4 to 0.85 times D4 and D6 is from 0.15 times D4 to 0.7 times D4. For example, when D4 is 2.0 mm, D5 may be between 0.4 mm and 1.7 mm and D6 may be between 0.3 mm and 1.4 mm. More typically, D5 is from 0.3 times D4 to 0.8 times D4 and D6 is from 0.2 times D4 to 0.6 times D4. In most cases, D5 is from 0.4 times D4 to 0.7 times D4 and D6 is from 0.25 times D4 to 0.5 times D4.

In some embodiments, the desired reduction in evaporation from sample wells 4 will be achieved when D5 is 50% of D4 and D6 is 33% of D4.

While the embodiments of evaporation control cover 10 described above provide enhanced fluid retention and consistency across each well 4, an alternative embodiment in which each hole 22 has identical diameters and each projecting port 42 has identical diameters will also provide enhanced fluid retention. See Table 2 below.

To provide for passage of sensor probe 12 through evaporation control cover 10, wettable insert 30 has a plurality of holes 32. Thus, holes 32 are also arranged in the same manner as holes 22 and upwardly projecting ports 42 such that upwardly projecting ports 42 pass through holes 32. Thus, the diameters of holes 32 correspond to the outside diameters of the corresponding upwardly projecting ports 42.

Tests were conducted to demonstrate the effectiveness of evaporation control cover 10. Each test was conducted over a 16-hour period at 25° C. using a shaker operating at 1000 RPM. For the tests conducted using evaporation control cover 10, wettable insert 30 is a polypropylene material with a thickness of 1.6 mm. The wetting liquid was deionized water.

Table 1 serves as a control and reflects the fluid loss from wells 4 in the absence of evaporation control cover 10. As reflected by Table 1, on average each well retained only 41.5% of the original fluid volume. The standard deviation for Table 1 is 3.2% and the coefficient of variation (% CV) is 7.6%. Table 2 reflects the improvement provided by use of evaporation control cover 10 with all holes 22 having a diameter of 3.4 mm. As reflected by Table 2, on average each well retained 93.2% of the original fluid volume. The standard deviation for Table 1 is 3.1% and the coefficient of variation (% CV) is 3.4%. Table 3 reflects the further improvement provided by using evaporation control cover 10 with varying diameter holes 22 as described above. In this instance, the outer perimeter holes (the holes within first outer perimeter row 52, second outer perimeter row 54, third outer perimeter row 56, and fourth outer perimeter row 58) have diameters of 2.4 mm, while holes 22 to the interior have diameters of 3.4 mm and holes 22 at locations 62, 64, 66, 68 have diameters of 2 mm. As reflected by Table 3, on average each well retained 93% of the original fluid volume. The standard deviation for Table 1 is 1.8% and the coefficient of variation (% CV) is 2.0%. For the sake of clarity and with reference to FIG. 1 and Tables 1-3, Al corresponds to hole 22 at location 68, A12 corresponds to hole 22 at location 62, H1 corresponds to hole 22 at location 66 and H12 corresponds to hole 22 at location 64. The remaining positions in each Table correspond to holes 22 in a like manner.

Thus, use of evaporation control cover 10 more than doubled the amount of fluid retained in each well 4. While the fluid retention provided by evaporation control cover 10 with identical holes 22 and with holes 22 of differing diameters is essentially identical, the version with holes 22 of differing diameters provides the further improvement of enhanced consistency from one well 4 to another well 4. Clearly, evaporation control cover 10 will provide a significant improvement to the evaluation of analytes as the improved fluid retention will improve confidence in the analytic results.

TABLE 1

| Control without Cover % Liquid Remaining | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 40.8 | 42.6 | 43.0 | 42.6 | 41.6 | 40.6 | 40.5 | 39.6 | 39.5 | 39.3 | 38.0 | 39.0 |
| B | 42.8 | 44.5 | 43.4 | 42.5 | 41.5 | 41.4 | 40.0 | 39.8 | 39.2 | 38.6 | 36.8 | 38.6 |
| C | 43.6 | 45.1 | 44.0 | 43.2 | 41.8 | 41.1 | 39.9 | 40.1 | 39.5 | 39.1 | 37.3 | 37.5 |
| D | 43.9 | 38.7 | 44.2 | 44.0 | 42.6 | 41.7 | 40.3 | 39.4 | 38.4 | 38.5 | 36.8 | 37.6 |
| E | 43.9 | 45.9 | 50.0 | 44.5 | 42.8 | 41.4 | 41.4 | 39.3 | 38.2 | 39.0 | 36.3 | 38.2 |
| F | 43.8 | 47.5 | 46.3 | 45.4 | 45.0 | 44.8 | 43.0 | 40.8 | 39.8 | 38.3 | 37.0 | 37.2 |
| G | 45.2 | 46.7 | 47.0 | 46.4 | 48.5 | 45.0 | 43.4 | 42.1 | 41.1 | 39.3 | 37.3 | 37.3 |
| H | 43.4 | 45.8 | 47.0 | 44.6 | 44.2 | 44.1 | 41.6 | 41.9 | 40.2 | 37.7 | 35.6 | 35.2 |

TABLE 2

| | With Cover % Liquid Remaining | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 81.3 | 88.9 | 89.7 | 90.0 | 90.8 | 90.2 | 91.3 | 91.3 | 90.9 | 90.9 | 88.8 | 88.2 |
| B | 93.6 | 94.3 | 95.0 | 95.8 | 95.2 | 96.0 | 95.3 | 94.7 | 95.5 | 95.4 | 95.0 | 90.0 |
| C | 93.0 | 95.4 | 95.5 | 96.0 | 96.0 | 95.8 | 87.3 | 95.4 | 96.2 | 95.4 | 95.6 | 89.4 |
| D | 93.6 | 95.5 | 95.5 | 94.5 | 95.7 | 94.9 | 94.3 | 96.4 | 96.2 | 95.6 | 95.4 | 89.2 |
| E | 93.6 | 95.2 | 96.1 | 95.5 | 96.4 | 94.7 | 95.9 | 95.4 | 96.5 | 95.3 | 95.0 | 87.7 |
| F | 91.6 | 96.8 | 95.5 | 95.6 | 95.5 | 95.8 | 95.3 | 94.8 | 95.1 | 95.8 | 93.1 | 87.3 |
| G | 90.7 | 94.3 | 94.9 | 94.9 | 94.7 | 95.9 | 95.7 | 94.9 | 94.8 | 93.8 | 93.6 | 88.9 |
| H | 86.6 | 91.3 | 90.4 | 90.9 | 88.6 | 93.8 | 91.7 | 91.0 | 90.8 | 91.2 | 85.1 | 85.5 |

TABLE 3

| | With Cover having Varying Diameter Holes % Liquid Remaining | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 93.0 | 93.4 | 92.6 | 91.9 | 91.2 | 91.0 | 90.7 | 88.7 | 87.8 | 86.3 | 87.4 | 87.3 |
| B | 93.1 | 93.1 | 94.6 | 93.5 | 96.9 | 93.7 | 95.8 | 92.5 | 92.4 | 92.3 | 98.0 | 89.7 |
| C | 91.7 | 95.0 | 92.0 | 94.2 | 93.8 | 94.3 | 93.8 | 94.0 | 93.0 | 92.5 | 90.2 | 90.6 |
| D | 91.3 | 94.1 | 93.9 | 94.0 | 94.3 | 92.8 | 93.8 | 93.4 | 93.3 | 92.9 | 94.1 | 91.0 |
| E | 90.7 | 94.9 | 94.3 | 94.9 | 94.1 | 93.9 | 94.0 | 93.2 | 92.5 | 93.0 | 94.0 | 92.8 |
| F | 92.3 | 93.7 | 94.0 | 93.3 | 93.5 | 93.5 | 93.3 | 92.8 | 92.6 | 92.9 | 92.2 | 93.5 |
| G | 91.9 | 93.9 | 94.3 | 93.4 | 93.8 | 93.7 | 94.3 | 93.6 | 93.0 | 93.4 | 93.6 | 93.5 |
| H | 90.7 | 92.4 | 94.0 | 93.9 | 93.7 | 94.7 | 94.8 | 94.6 | 94.2 | 94.0 | 93.9 | 93.8 |

In still another embodiment, evaporation control cover 10 has a configuration similar to that of FIG. 5, i.e., evaporation control cover 10 is stationary with sample tray 2 moving beneath it. However, in the alternative embodiment depicted in FIG. 7, evaporation control cover 10 is only top 20 as this configuration lacks a bottom. In the absence of a bottom, a wettable insert is also omitted from the cover 10. The embodiment of FIG. 7 includes the same arrangement of holes 22 discussed above and shown in FIG. 8. Specifically, holes 22 located to the interior of perimeter rows 52-58 have a first diameter (D1). Holes 22 within perimeter rows 52-58 have a second diameter (D2) which is less than the first diameter and corner holes 62, 64, 66 and 68 have a third diameter (D3). The third diameter is equal to or less than the second diameter. Thus, the diameters for each location can be stated as D1≥D2≥D3. The sizes of the first diameter, second diameter and third diameter will depend on the configuration of evaporation control cover 10. In this embodiment, D1 may be 0.5 mm and about 5.0 mm. More commonly, D1 may be between about 0.7 mm and about 4.5 mm. More typically, D1 will be between about 0.9 mm and about 3.9 mm. In this configuration, D2 may be from 0.2 times D1 to 0.85 times D1 and D3 is from 0.15 times D1 to 0.7 times D1. For example, when D1 is 2.0 mm, D2 may be between 0.4 mm and 1.7 mm and D3 may be between 0.3 mm and 1.4 mm. More typically, D2 is from 0.3 times D1 to 0.8 times D1 and D3 is from 0.2 times D1 to 0.6 times D1. In most cases, D2 is from 0.4 times D1 to 0.7 times D1 and D3 is from 0.25 times D1 to 0.5 times D1.

Other embodiments of the present invention will be apparent to one skilled in the art. As such, the foregoing description merely enables and describes the general uses and methods of the present invention. Accordingly, the following claims define the true scope of the present invention.

What is claimed is:

1. An evaporation control cover for use with a multi-well sample tray, said multi-well sample tray having a plurality of regularly spaced sample wells as defined by an outer perimeter of sample wells, with additional sample wells located within said outer perimeter of sample wells, said evaporation control cover comprising:

a top having:

a plurality of sample holes arranged to correspond to said plurality of regularly spaced sample wells and defined by an outer perimeter of sample holes with additional sample holes located within said outer perimeter of holes;

said additional sample holes located within said outer perimeter of holes having a first diameter;

said outer perimeter of sample holes having a second diameter; and a downwardly projecting flange carried by said evaporation control cover, said downwardly projecting flange configured to fit over said multi-well sample tray; and a wettable insert having a plurality of insert holes aligned with said sample holes, wherein said wettable insert is disposed beneath said top.

2. The evaporation control cover of claim 1, wherein said second diameter is different from said first diameter.

3. The evaporation control cover of claim 2, wherein said second diameter is from about 0.2 times the first diameter to about 0.85 times the first diameter.

4. The evaporation control cover of claim 1, wherein said evaporation control cover is configured to fit over said multi-well sample tray, and wherein said evaporation control cover is configured to remain stationary and not inhibit movement of said multi-well sample tray.

5. The evaporation control cover of claim 1, wherein said plurality of regularly spaced sample wells are arranged in a rectangular configuration, wherein said plurality of sample holes are arranged in a rectangular configuration corresponding to said plurality of regularly spaced sample wells, wherein said plurality of sample holes are defined by a plurality of outer perimeter rows comprising a first outer perimeter row, a second outer perimeter row, a third outer perimeter row and a fourth outer perimeter row, and wherein said plurality of outer perimeter rows define said rectangular configuration as having a first corner hole, a second corner hole, a third corner hole and a fourth corner hole with additional rows of sample holes located within said rectangular configuration.

6. The evaporation control cover of claim 1, wherein the evaporation control cover is sized and shaped to allow passage of a sensor probe therethrough via the sample holes and the insert holes.

7. The evaporation control cover of claim 1, wherein the downwardly projecting flange is sized and shaped to result in a gap between the multi-well sample tray and the evaporation control cover.

8. An evaporation control cover for use with a multi-well sample tray, said multi-well sample tray having a plurality of regularly spaced sample wells defined by an outer perimeter of sample wells with additional sample wells located within said outer perimeter of sample wells, said evaporation control cover comprising:

- a top having:
  - a plurality of sample holes arranged to correspond to said plurality of regularly spaced sample wells; and
  - a downwardly projecting flange carried by said top, said downwardly projecting flange configured to fit over said multi-well sample tray;
- a bottom having:
  - a plurality of upwardly projecting ports, said upwardly projecting ports configured to provide fluid communication through said bottom and said upwardly projecting ports, and said upwardly projecting ports configured to correspond to said plurality of regularly spaced sample wells; and
  - an upwardly projecting flange carried by said bottom, said upwardly projecting flange configured to fit within said downwardly projecting flange of said top;
- a region disposed within said upwardly projecting flange and around said upwardly projecting ports that forms a reservoir; and
- a wettable insert positioned within said reservoir,
- wherein said upwardly projecting ports are configured to provide fluid communication between said sample holes and said regularly spaced sample wells, and
- wherein said top, said wettable insert, and said bottom combined together are configured to reduce or preclude the loss of liquid from said plurality of regularly spaced sample wells.

9. The evaporation control cover of claim 8, wherein said evaporation control cover is configured to fit over said multi-well sample tray, and wherein said evaporation control cover is configured to remain stationary and not inhibit movement of said multi-well sample tray.

10. The evaporation control cover of claim 8, wherein said evaporation control cover is configured to engage said multi-well sample tray.

11. The evaporation control cover of claim 8, wherein the plurality of regularly spaced sample wells of the multi-well sample tray are arranged in a rectangular configuration defined by a plurality of outer perimeter rows comprising a first outer perimeter row, a second outer perimeter row, a third outer perimeter row and a fourth outer perimeter row, wherein said plurality of outer perimeter rows defines said rectangular configuration as having a first corner well, a second corner well, a third corner well and a fourth corner well with additional rows of sample wells located within said rectangular configuration;

- wherein the plurality of sample holes are arranged in a rectangular configuration corresponding to said plurality of regularly spaced sample wells, wherein the plurality of sample holes are defined by a plurality of top outer perimeter rows comprising a first top outer perimeter row, a second top outer perimeter row, a third top outer perimeter row and a fourth top outer perimeter row, and wherein said plurality of top outer perimeter rows defines said rectangular configuration as having a first corner hole, a second corner hole, a third corner hole and a fourth corner hole with additional rows of sample holes located within said rectangular configuration; and,
- wherein the plurality of upwardly projecting ports in the bottom are arranged in a rectangular configuration corresponding to said plurality of regularly spaced sample wells, wherein said plurality of upwardly projecting ports is defined by a plurality of bottom outer perimeter rows comprising a first bottom outer perimeter row, a second bottom outer perimeter row, a third bottom outer perimeter row and a fourth bottom outer perimeter row, and wherein said plurality of bottom outer perimeter rows defines said rectangular configuration as having a first corner upwardly projecting port, a second corner upwardly projecting port, a third corner upwardly projecting port and a fourth corner upwardly projecting port with additional rows of upwardly projecting ports located within said rectangular configuration.

12. The evaporation control cover of claim 11, wherein said sample holes within said plurality of top outer perimeter rows have a first diameter; and

- wherein said sample holes within said plurality of top outer perimeter rows have a second diameter which is less than or equal to said first diameter.

13. The evaporation control cover of claim 12, wherein said second diameter is from about 0.2 times the first diameter to about 0.85 times the first diameter.

14. The evaporation control cover of claim 8, further comprising a fluid port providing fluid communication through said top with said reservoir.

15. An evaporation control cover for use with a multi-well sample tray, said multi-well sample tray having a plurality of regularly spaced sample wells arranged in a rectangular configuration as defined by a plurality of outer perimeter rows comprising a first outer perimeter row, a second outer perimeter row, a third outer perimeter row and a fourth outer perimeter row, said plurality of outer perimeter rows defining said rectangular configuration as having a first corner well, a second corner well, a third corner well and a fourth corner well with additional rows of sample wells located within said rectangular configuration, said evaporation control cover comprising:

- a top having:
  - a plurality of sample holes arranged in a rectangular configuration corresponding to said plurality of regularly spaced sample wells and defined by a plurality of top outer perimeter rows comprising a first top outer perimeter row, a second top outer perimeter row, a third top outer perimeter row and a fourth top outer perimeter row, said plurality of top outer perimeter rows defining said rectangular configuration as having a first top corner hole, a second top corner hole, a third top corner hole and a fourth top corner hole with additional rows of sample holes located within said rectangular configuration;

said sample holes within said plurality of sample holes and located to the interior of said first top outer perimeter row, said second top outer perimeter row, said third top outer perimeter row and said fourth top outer perimeter row having a first diameter;

said sample holes within said first top outer perimeter row, said second top outer perimeter row, said third top outer perimeter row and said fourth top outer perimeter row having a second diameter which is less than or equal to said first diameter; and a downwardly projecting flange carried by said top, said downwardly projecting flange configured to fit over said multi-well sample tray;

a bottom having:

a plurality of upwardly projecting ports, said upwardly projecting ports configured to provide fluid communication through said bottom and said upwardly projecting ports, said upwardly projecting ports being positioned in a rectangular configuration corresponding to said plurality of regularly spaced sample wells and defined by a plurality of bottom outer perimeter rows comprising a first bottom outer perimeter row, a second bottom outer perimeter row, a third bottom outer perimeter row and a fourth bottom outer perimeter row, said plurality of bottom outer perimeter rows defining said rectangular configuration as having a first corner upwardly projecting port, a second corner upwardly projecting port, a third corner upwardly projecting port and a fourth corner upwardly projecting port with additional rows of upwardly projecting ports located within said rectangular configuration; and an upwardly projecting flange carried by said bottom, said upwardly projecting flange configured to fit within said downwardly projecting flange of said top;

a region disposed within said upwardly projecting flange and around said upwardly projecting ports that forms a reservoir; and a wettable insert positioned within said reservoir, wherein said upwardly projecting ports are configured to provide fluid communication between said sample holes and said regularly spaced sample wells, and wherein said top, said wettable insert, and said bottom combined together are configured to reduce or preclude the loss of liquid from said plurality of regularly spaced sample wells.

16. The evaporation control cover of claim 15, wherein said evaporation control cover is configured to fit over said multi-well sample tray, and wherein said evaporation control cover is configured to remain stationary and not inhibit movement of said multi-well sample tray.

17. The evaporation control cover of claim 15, wherein said evaporation control cover is configured to engage said multi-well sample tray.

18. The evaporation control cover of claim 15, wherein said second diameter is from about 0.2 times the first diameter to about 0.85 times the first diameter.

19. The evaporation control cover of claim 15, wherein said first top corner hole, said second top corner hole, said third top corner hole and said fourth top corner hole together form a plurality of corner holes;

wherein said plurality of corner holes have a third diameter;

wherein said upwardly projecting ports located within said rectangular configuration have a fourth inside diameter;

wherein said upwardly projecting ports within said plurality of bottom outer perimeter rows have a fifth inside diameter which is less than or equal to said fourth inside diameter; and wherein said first corner upwardly projecting port, said second corner upwardly projecting port, said third corner upwardly projecting port, and said fourth corner upwardly projecting port together form a plurality of corner upwardly projecting ports, and wherein said plurality of corner upwardly projecting ports have a sixth inside diameter which is less than or equal to said fifth inside diameter.

20. The evaporation control cover of claim 15, further comprising a fluid port providing fluid communication through said top with said reservoir.

* * * * *